United States Patent
Ahuja et al.

(10) Patent No.: US 7,644,266 B2
(45) Date of Patent: Jan. 5, 2010

(54) APPARATUS, SYSTEM, AND METHOD FOR MESSAGE LEVEL SECURITY

(75) Inventors: Pratima Ahuja, Foster City, CA (US); Manoj Khangaonkar, Foster City, CA (US); Kai Mike Zhang, Lake Oswego, OR (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 10/948,609

(22) Filed: Sep. 23, 2004

(65) Prior Publication Data

US 2006/0064751 A1   Mar. 23, 2006

(51) Int. Cl.
H04L 29/06   (2006.01)
(52) U.S. Cl. .................. 713/151; 713/166; 713/176; 709/238; 709/244
(58) Field of Classification Search ................ 713/151, 713/166, 176, 152; 726/14; 719/313, 314, 719/315; 709/201, 227, 229; 705/79
See application file for complete search history.

(56) References Cited

U.S. PATENT DOCUMENTS

| | | | |
|---|---|---|---|
| 5,602,916 A | 2/1997 | Grube et al. | |
| 5,615,261 A | 3/1997 | Grube et al. | |
| 5,784,463 A | 7/1998 | Chen et al. | 380/21 |
| 5,935,248 A * | 8/1999 | Kuroda | 726/14 |
| 5,940,187 A * | 8/1999 | Berke | 358/434 |
| 5,960,086 A | 9/1999 | Atalla | 380/44 |
| 6,021,203 A * | 2/2000 | Douceur et al. | 380/252 |
| 6,185,612 B1 | 2/2001 | Jensen et al. | |
| 6,490,679 B1 | 12/2002 | Tumblin et al. | 713/155 |
| 6,567,913 B1 | 5/2003 | Ryan, Jr. | 713/156 |
| 7,137,099 B2 * | 11/2006 | Knight et al. | 717/100 |
| 7,165,179 B2 | 1/2007 | Maruyama et al. | |
| 7,236,597 B2 | 6/2007 | Elliot et al. | |
| 7,257,843 B2 | 8/2007 | Fujita et al. | |
| 7,269,260 B2 | 9/2007 | Adachi et al. | |

(Continued)

FOREIGN PATENT DOCUMENTS

EP   0409397 A2   1/1991

(Continued)

OTHER PUBLICATIONS

Reiner Sailer and Matthias Kabatnik "History Based Distributed Filtering—A Tagging Approach to Network-Level Access Control" IEEE (2000) pp. 373-382.

(Continued)

Primary Examiner—Kimyen Vu
Assistant Examiner—April Y Shan
(74) Attorney, Agent, or Firm—Kunzler & McKenzie

(57) ABSTRACT

An apparatus, system, and method are disclosed for selective, end-to-end message level security. The apparatus includes a message class definition module, a security module, and a messaging module. The message class definition module identifies a predetermined message class of an internode message. The security module applies security to the message at an application layer. The security that is applied to the message corresponds to a security level, which depends on the message class of the message. The security may include encryption, authentication, and/or other security features. The messaging module communicates the message between a first node and a second node. A third node, such as a broker, may be interposed between the first and second nodes, in which case the security of the message is preserved at the third node.

21 Claims, 8 Drawing Sheets

U.S. PATENT DOCUMENTS

| | | | |
|---|---|---|---|
| 7,350,212 B2 * | 3/2008 | Lambert et al. | 719/315 |
| 2001/0005883 A1 * | 6/2001 | Wray et al. | 713/151 |
| 2002/0073313 A1 | 6/2002 | Brown et al. | |
| 2002/0116619 A1 | 8/2002 | Maruyama et al. | |
| 2002/0123325 A1 * | 9/2002 | Cooper | 455/411 |
| 2003/0033349 A1 * | 2/2003 | Lambert et al. | 709/201 |
| 2003/0074579 A1 * | 4/2003 | Della-Libera et al. | 713/200 |
| 2003/0131245 A1 | 7/2003 | Linderman | 713/176 |
| 2003/0172167 A1 * | 9/2003 | Judge et al. | 709/229 |
| 2004/0071137 A1 | 4/2004 | He et al. | |
| 2004/0078334 A1 | 4/2004 | Malcolm et al. | 705/50 |
| 2004/0139314 A1 | 7/2004 | Cook et al. | |
| 2004/0223615 A1 | 11/2004 | Dhawan | |
| 2005/0015592 A1 * | 1/2005 | Lin | 713/166 |
| 2006/0015932 A1 * | 1/2006 | Ballinger et al. | 726/9 |
| 2006/0015933 A1 * | 1/2006 | Ballinger et al. | 726/10 |
| 2006/0064736 A1 * | 3/2006 | Ahuja et al. | 726/1 |
| 2006/0106938 A1 | 5/2006 | Dini et al. | |

OTHER PUBLICATIONS

By James Hart, IBM Software Group, "Connecting your applications without complex programming", WebSphere Software, Sep. 2003.

Son, Zimmerman, Hansson "An adaptable security manager for real-time transactions", p. 1-8.

By Anita Karve, "SSL and S-HTTP" Jan. 1, 1997; http://www.networkmagazine.com/shared/article/showArticle.jhtml?articleID=17601054.

By Dirk Reinshagen, "XML Messaging, Part 2, XML messaging the Soap way", http://www.javaworld.com/javaworld/jw-06-2001/jw-0622-xmlmessaging2_p.html.

"The 7 layers of the OSI model", webopedia, http://webopedia.internet.com/quick_ref/OSI_Layers.asp.

"IBM Tivoli Access Manager for Business Integration Administration Guide" Overview, Version 5.1 SC23-4831-01, http://publib.boulder.ibm.com/trividd/td/ITAMFBI/SC23-4831-01/en_US/HTML/ADM51....

"IBM Tivoli Access Manager for Business Integration Administration Guide" Product Concepts, Version 5.1 SC23-4831-01, http://publib.boulder.ibm.com/trividd/td/ITAMFBI/SC23-4831-01/en_US/HTML/ADM51....

Son et al., "An Adaptable Security Manager for Real-Time Transactions", 2000, Real-Time Systems, 2000. Euromicro RTS 2000. 12th Euromicro Conference.

* cited by examiner

APPARATUS, SYSTEM, AND METHOD FOR MESSAGE LEVEL SECURITY

BACKGROUND OF THE INVENTION

1. Field of the Invention

This invention relates to data communications and more particularly relates to message level security of data communications.

2. Description of the Related Art

Node-to-node security, also referred to as link level security, guarantees that data is secure while being transferred from one node to another within a communication system. Data security can encompass multiple aspects. Two common aspects of data security are integrity and privacy considerations. Integrity security employs a technology, such as digital signatures, to prevent data from being tampered with or forged by an unauthorized party. By using a digital signature, a receiver or destination node may be able to verify the sender's identity and know if the data has been altered or forged. Privacy security employs a technology, such as encryption, to restrict access to sensitive data and, thereby, prevent disclosure to or collection by an unauthorized party. One, both, or neither of these security technologies may be employed for the transmission of data.

A common implementation of link level security is secure socket layer (SSL), which is a transport layer security technology that encrypts data during data transmission between two nodes. Additionally, SSL does not provide end-to-end security for asynchronous communications.

FIG. 1 shows a communication system that includes three nodes. When the source node sends a communication to the destination node, the data may pass through the intermediate node. The communication between the source node and the intermediate node is a synchronous communication because the intermediate node is actively participating in the communication. Once the intermediate node receives the data from the source node, the intermediate node may store the data on a storage device, such as a hard disk drive. The intermediate node subsequently initiates a synchronous communication with the destination node to deliver the data. In this way, the data may be communicated from the source node to the destination node.

By implementing SSL for the data communication, the data is secure during the transmission from the source node to the intermediate node and from the intermediate node to the source node. However, the data is not secure while stored on the electronic storage device or other data retention device on the intermediate node. This insecure storage of the data on the intermediate node provides an opportunity for an unauthorized party to access and potentially tamper with the insecure data. Although SSL provides link level security, it cannot ensure end-to-end security of the data communication. End-to-end security guarantees that data is secure during the entire communication process from the source node to the destination node.

The conventional SSL technology also fails to address the issue of performance on the communication system. By implementing a transport layer security technology such as SSL, the communication system cannot discriminate between data communications that should be protected and those that do not need to be protected. Rather, the communication system simply protects all communications to the extent possible. However, this protection has a very high operating cost due to the time and processing that is required to ensure privacy of the data communications.

Another conventional security technology that was introduced for internet communications is secure hypertext transfer protocol (S-HTTP). S-HTTP, similar to SSL, implements encryption technology to secure the privacy of a data communication. Additionally, although S-HTTP is an application layer security technology, S-HTTP is not widely accepted because it has many disadvantages.

One of the disadvantages of S-HTTP is that it is protocol-specific—it is designed specifically for the HTTP protocol and is not used with any other protocols. Also, S-HTTP does not provide true end-to-end security in a multi-node communication system having intermediate nodes. Rather, S-HTTP is a link level security technology that provides security between an HTTP client and an HTTP server. S-HTTP is also limited, similar to SSL, to synchronous communications because it is a request-response communication protocol. Additionally, S-HTTP also fails to address the performance of the communication system—S-HTTP applies security features to all messages, regardless of the nature of the message.

From the foregoing discussion, it should be apparent that a need exists for an apparatus, system, and method for end-to-end message level security. Beneficially, such an apparatus, system, and method would additionally allow selective security protection in order to address the security cost/performance balance of the communication system.

SUMMARY OF THE INVENTION

The present invention has been developed in response to the present state of the art, and in particular, in response to the problems and needs in the art that have not yet been fully solved by currently available data communication systems. Accordingly, the present invention has been developed to provide an apparatus, system, and method for selective, end-to-end message level security that overcome many or all of the above-discussed shortcomings in the art.

The apparatus to facilitate end-to-end message level security is provided with a logic unit containing a plurality of modules configured to functionally execute the necessary operation for selective, end-to-end message level security. These modules in the described embodiments include a security module, a messaging module, a message class definition module, a security level definition module, a security level mapping module, an encryption module, a decryption module, a signature module, and a verification module.

In one embodiment, the message class definition module identifies a predetermined message class of an internode message, which is a message communicated or intended to be communicated between two nodes. The security module, in one embodiment, applies security to the message at an application layer. The security may correspond to a security level, which may depend on the message class. The security that is applied to the message may include one or more security features, including encryption, authentication, message integrity, and so forth. The messaging module, in one embodiment, communicates the message between a first node and a second node.

In another embodiment, the messaging module also may communicate the message via an intermediate node, such as a third node interposed between the first node and the second node. For instance, the message may be communicated via a broker between a source node and a destination node. The third node is configured, in at least one embodiment, to preserve the security of the message at the third node. In other words, the encryption, authentication, and/or message integrity that is applied by the source node at the application layer is preserved while the message is stored on the broker.

The messaging module may communicate the message in either a synchronous communication environment or in an asynchronous communication environment. A synchronous communication environment includes a communication environment that is time-dependent in which data processing relies, at least in part, on the availability of the sending and receiving nodes and/or the network. An asynchronous communication environment includes a communication environment that is time-independent in which data processing does not rely on the availability of the nodes or the network. In other words, asynchronous messaging decouples applications on each of the nodes from each other and from the network.

In another embodiment, the apparatus may include an encryption module to encrypt the message at the sending node according to the security level of the message. Similarly, another embodiment of the apparatus may include a decryption module in order to decrypt the message at the receiving node. The decryption module may be useful at a receiving node when both the sending node and the receiving node each have a message apparatus.

In another embodiment, the apparatus also may include a signature module to digitally sign the message at the sending node according to the security level of the message. Similarly, another embodiment of the apparatus may include a verification module in order to verify the digital signature at the receiving node.

In another embodiment, the apparatus also may include a message class definition module to maintain a message class definition descriptive of a message type within the message class. The message class definition may define a plurality of message classes and each message class may include one or more message types, which may be expressed in terms of data structure, file extension, directory location, or any other way in which data may be classified.

In another embodiment, the apparatus also may include a security level definition module to maintain a security level definition descriptive of the security level. For example, the security level definition may define which security features are to be implemented for each of the security levels.

In another embodiment, the apparatus may include a security level mapping module to map the security level to the message class. In other words, the security level map may describe which message classes are subjected to certain security levels.

A system of the present invention is also presented to facilitate message security. The system may be embodied in a single node, in one embodiment, or in a communication system have a plurality of nodes. In particular, the system, in one embodiment, may include an electronic storage device, a message apparatus, and a network interface. The electronic storage device, in one embodiment, stores a message class definition descriptive of a predetermined message class. The message apparatus, in one embodiment, identifies an internode message within the predetermined message class and applies security to the internode message at an application layer. The security features applied to the message may correspond to a security level, which may depend on the message class of the message. The network interface, in one embodiment, transmits the internode message from a first node to a second node.

In another embodiment, the system also may include a security level mapping module to map the security level to the message class. In another embodiment, the message apparatus also may communicate the message in an asynchronous communication environment.

Another embodiment of the system may include a first node, a second node, and a broker node. The first node, in one embodiment, applies security to a message at an application level, wherein the security corresponds to a security level, which may depend on a message class of the message. The broker node, in one embodiment, receives the message from the first node and maintains the security of the message at the broker node. The second node, in one embodiment, receives the message from the broker node.

A signal bearing medium is also presented to store a program that, when executed, performs operations to facilitate message security. In one embodiment, the operations include identifying a predetermined message class of an internode message, applying security to the message at an application layer, the security corresponding to a security level, the security level depending on the message class, and communicating the message between a first node and a second node.

In another embodiment, the operations also may include communicating the message via a third node interposed between the first node and the second node, preserving the security of the message at the third node, and/or communicating the message in a synchronous or an asynchronous communication environment. In further embodiments, the operations also may include encrypting the message, digitally signing the message, maintaining a security level definition descriptive of the security level, maintaining a security level map mapping the security level to the message class, and/or maintaining a message class definition descriptive of a message type within the message class.

A method of the present invention is also presented for message security. The method in the disclosed embodiments substantially includes the operations necessary to carry out the functions presented above with respect to the operation of the described apparatus and system. Furthermore, some or all of the operations of the method may be substantially similar to the operations that are performed when the program on the signal bearing medium is executed.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
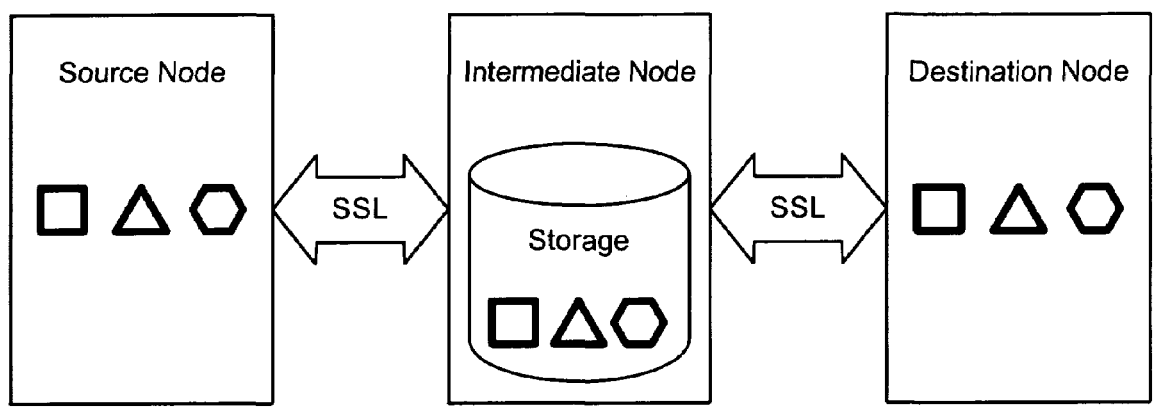
FIG. 1 is a schematic block diagram illustrating a conventional communication system.
Figure 2:
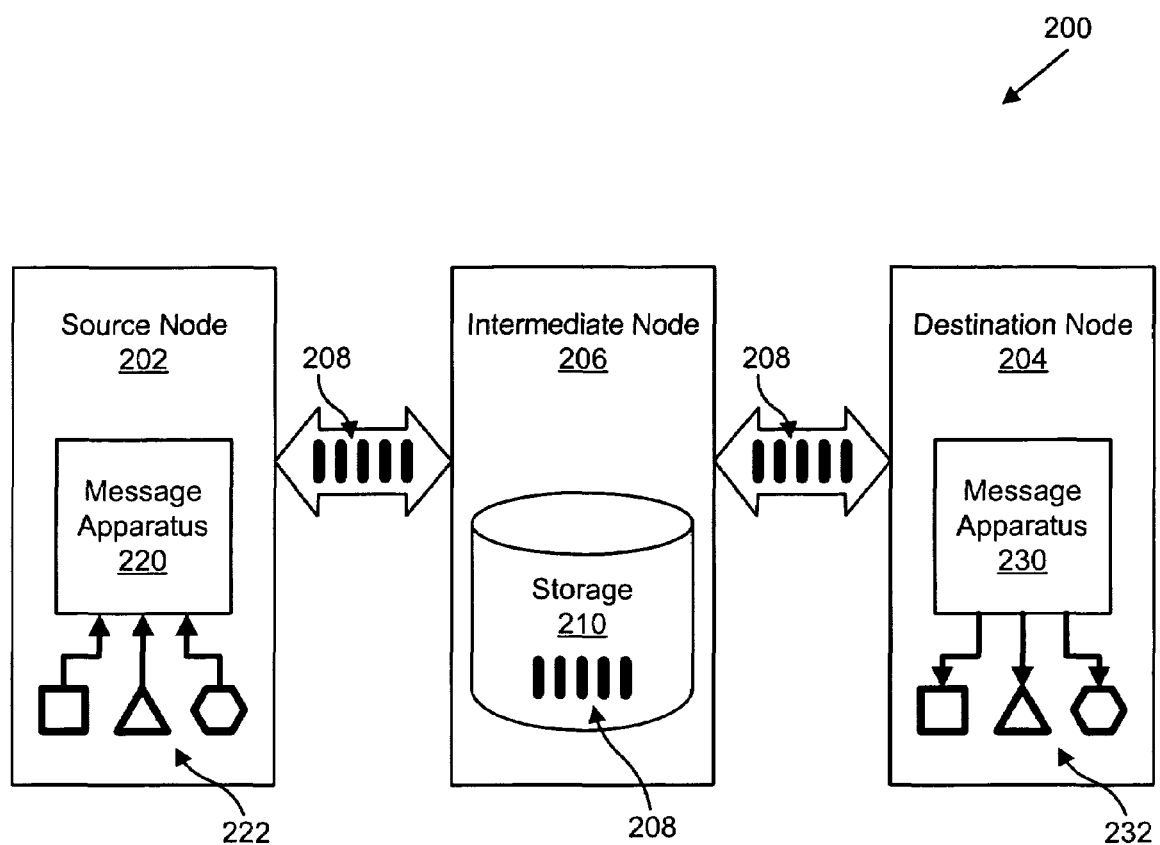
FIG. 2 is a schematic block diagram illustrating one embodiment of communication system for selective, end-to-end message level security.

FIG. 2 depicts one embodiment of communication system 200 for selective, end-to-end message level security. The illustrated communication system 200 includes a source node 202, a destination node 204, and an intermediate node 206. The source node 202 is configured to send one or more messages 208 to the destination node 204. The source node 202 may communicate the messages 208 to the destination node 204 via the intermediate node 206, as shown, or directly without the intermediate node 206. If the messages 208 are sent via an intermediate node 206, such as a broker, the intermediate node 206 may store the messages 208, at least temporarily, on an electronic storage device 210. In one embodiment, the electronic storage device 210 may be a hard disk drive or another data storage device. Alternatively, the intermediate node 206 may store the messages 208 on an electronic memory device (not shown), such as random access memory (RAM) or another data memory device.

In one embodiment, the messages 208 originate at the source node 202. The source node 202 includes a message apparatus 220 that is described in more detail with reference to FIG. 3. In one embodiment, the message apparatus 220 may be implemented as an application program interface (API) within the source node 202. Generally, the message apparatus 220 identifies an internode message 222 and selectively applies one or more security features to the message 222 before transmitting the secure message 208 to the destination node 204. In certain embodiments, the security features may include one or more of the following: encryption, authentication, message integrity, and/or other security features.

In order to provide end-to-end message security and ensure that the message is secure (both privacy and integrity), the security features may be implemented in the application layer that supports application-specific, end-user processes. By applying security to the message 222 at the application layer and transmitting the secure message 208 to the destination node 204, the secure message 208 remains secure throughout the communication. Additionally, the security of the message 208 is preserved even while the message 208 is temporarily stored on the electronic storage device 210 of the intermediate node 206. In this way, the message 208 may be retrieved by the destination node 204 from the intermediate node 206 with the security of the message 208 preserved from the source node 202 all the way to the destination node 204. The destination node 204 then may authenticate and/or decrypt the secure messages 208 in order to process the received messages 232.

Figure 3:
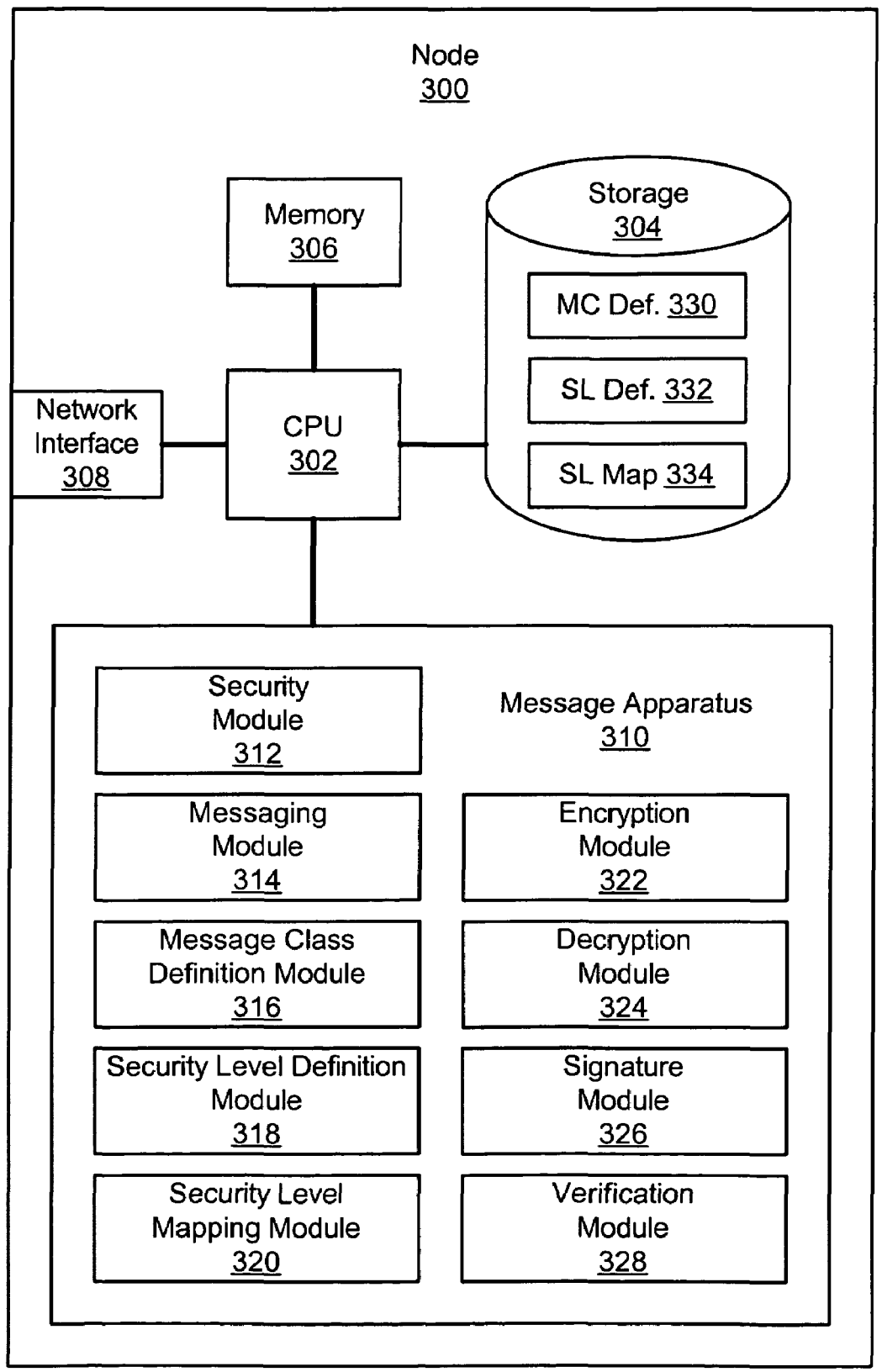
FIG. 3 is a schematic block diagram illustrating one embodiment of a node that may be used for selective, end-to-end message level security.

FIG. 3 depicts one embodiment of a node 300 that may be used for end-to-end message level security. In one embodiment, the node 300 may be representative of a source node 202 or a destination node 204. The illustrated node 300 includes a central processing unit (CPU) 302, an electronic storage device 304, an electronic memory device 306, a network interface device 308, and a message apparatus 310.

In one embodiment, the CPU 302 is configured to process data requests, operations, and commands to manage the node 300. The electronic storage device 304 is configured, in one embodiment, to electronically store data that is related to the management and operation of the node 300. In one embodiment, the electronic storage device 304 may be persistent memory or another type of persistent data storage. Similarly, the electronic memory device 306 is configured, in one embodiment, to electronically store data that may be used for management and operation of the node 300 and/or application programs that may be executed on the node 300. The network interface device 308 allows communications to occur between the node 300 and other nodes within a communication system. Alternatively, the network interface device 308 may allow communications between, for example, the source node 202 and the destination node 204.

The message apparatus 310, in one embodiment, may be substantially similar to the message apparatus 220 of the source node 202 and/or the message apparatus 230 of the destination node 204 of FIG. 2. The illustrated message apparatus 310 includes a security module 312, a messaging module 314, a message class definition module 316, a security level definition module 318, and a security level mapping module 320. The illustrated message apparatus 310 also includes an encryption module 322, a decryption module 324, a signature module 326, and a verification module 328.

In one embodiment, the security module 312 applies security to an internode message 222. An internode message is a message communicated or intended to be communicated between two nodes. The security module 312 applies the security to the message 222 at an application layer, as opposed to a transport layer or another layer within a networking framework. The security technology that the security module 312 implements to secure the message 222 may vary depending on a message class to which the message 222 belongs.

In one embodiment, the messaging module 314 communicates the secure message 208 from the node 300 to another node. Alternatively, the messaging module 314 may receive a secure message 208 at the node 300 from another node. The messaging module 314 may facilitate a communication that is directly between two nodes or that is communicated via one or more intermediate nodes, such as a broker.

Additionally, the messaging module 314 may communicate the secure message 208 within either a synchronous communication environment or an asynchronous communication environment. A synchronous communication environment includes a communication environment that is time-dependent in which data processing relies, at least in part, on the availability of the sending and receiving nodes and/or the network. An asynchronous communication environment includes a communication environment that is time-independent in which data processing does not rely on the availability of the nodes or the network. In other words, asynchronous messaging decouples applications on each of the nodes from each other and from the network.

In one embodiment, the message class definition module 316 identifies a a predetermined message class of the internode message 222. In another embodiment, the message class definition module 316 also maintains a message class definition 330 descriptive of a message type within the message class. An example of a message class definition 330 is described in more detail with reference to FIG. 4. In one embodiment, the message class definition module 316 maintains the message class definition 330 on the electronic storage device 304. Alternatively, the message class definition module 316 may maintain the message class definition 330, or a copy thereof, on another storage or memory device.

In one embodiment, the security level definition module 318 maintains a security level definition 332 descriptive of the security level of the internode messages. In fact, the security level definition 332 may define a plurality of security levels. An example of a security level definition 332 is described in more detail with reference to FIG. 5. In one embodiment, the security level definition module 318 maintains the security level definition 332 on the electronic storage device 304. Alternatively, the security level definition module 318 maintains the security level definition 332, or a copy thereof, on another storage or memory device.

In one embodiment, the security level mapping module 320 maintains a security level map 334 to map the security level to the message class. Furthermore, the security level mapping module 320 may map a plurality of security levels to a plurality of message classes. In other words, the security level map 334 may describe which message classes are subjected to certain security levels or features. An example of a security level map 334 is described in more detail with reference to FIG. 6. In one embodiment, the security level mapping module 320 maintains the security level map 334 on the electronic storage device 304. Alternatively, the security level mapping module 320 maintains the security level map 334, or a copy thereof, on another storage or memory device.

In one embodiment, the encryption module 322 encrypts the message 222 at the sending node according to the security level of the message 222. Correspondingly, the decryption module 324 is configured to decrypt the message 208 at the receiving node.

The signature module 326, in one embodiment, digitally signs the internode message at the sending node according to the security level of the message 222. Correspondingly, the verification module 328 verifies the digital signature at the receiving node.

Figure 4:
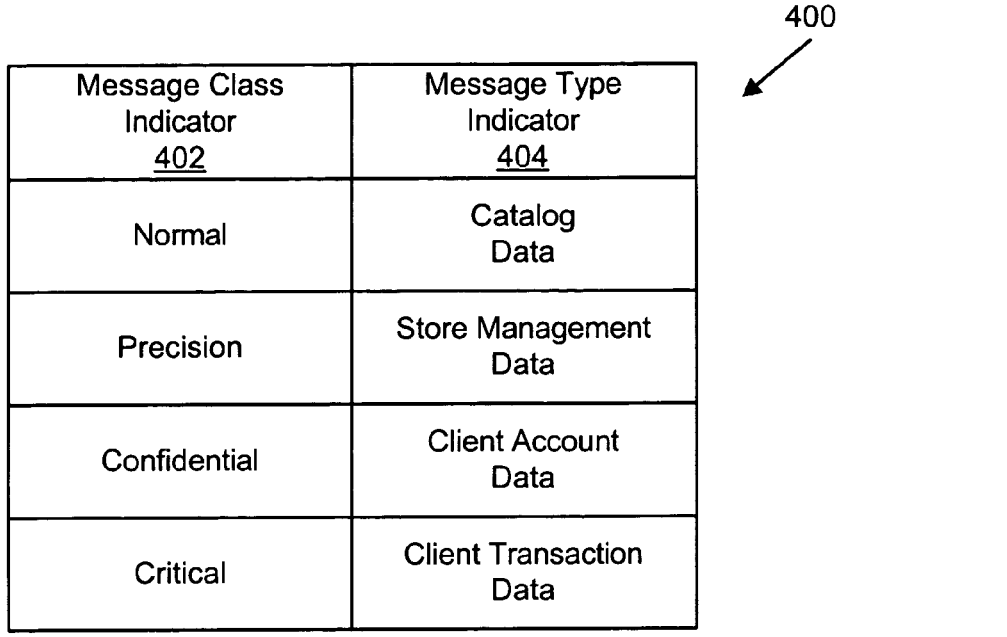
FIG. 4 is a schematic diagram illustrating one embodiment of a message class definition.

FIG. 4 depicts one embodiment of a message class definition 400 that is substantially similar to the message class definition 330 of FIG. 3. In one embodiment, the message class definition 400 defines a plurality of message classes. Each message class may include one or more message types, which may be expressed in terms of data structure, file extension, directory location, or any other way in which data may be classified. In one embodiment, the message class definition 400 may include a message class indicator 402 and a message type indicator 404. The message class indicator 402 indicates the class, generally, and may be a name or other identifier to identify the class as a whole. The message type indicator 404 indicates the type of files or other data structures that may be included in the corresponding message class. In another embodiment, multiple message type indicators 404 may be associated with a single message class indicator 402.

In the illustrated example, the message class definition 400 may define four classes: normal, precision, confidential, and critical. In another embodiment, the message class definition 400 may define fewer or more message classes. Additionally, the message class definition 400 may use different message class indicators 402 to identify each message class within the message class definition 400. In one embodiment, the message class to which a message may be assigned may depend, at least in part, on the sensitivity of the data contained in the message. In the depicted embodiment, the normal class includes catalog data. The precision class includes store management data. The confidential class includes client account data. The critical class includes client transaction data. Although the present example is described in terms of purchase transaction data, the message classes and types may vary and the message class definition 400 may be modified to adapt to such message classes and types.

Figure 5:
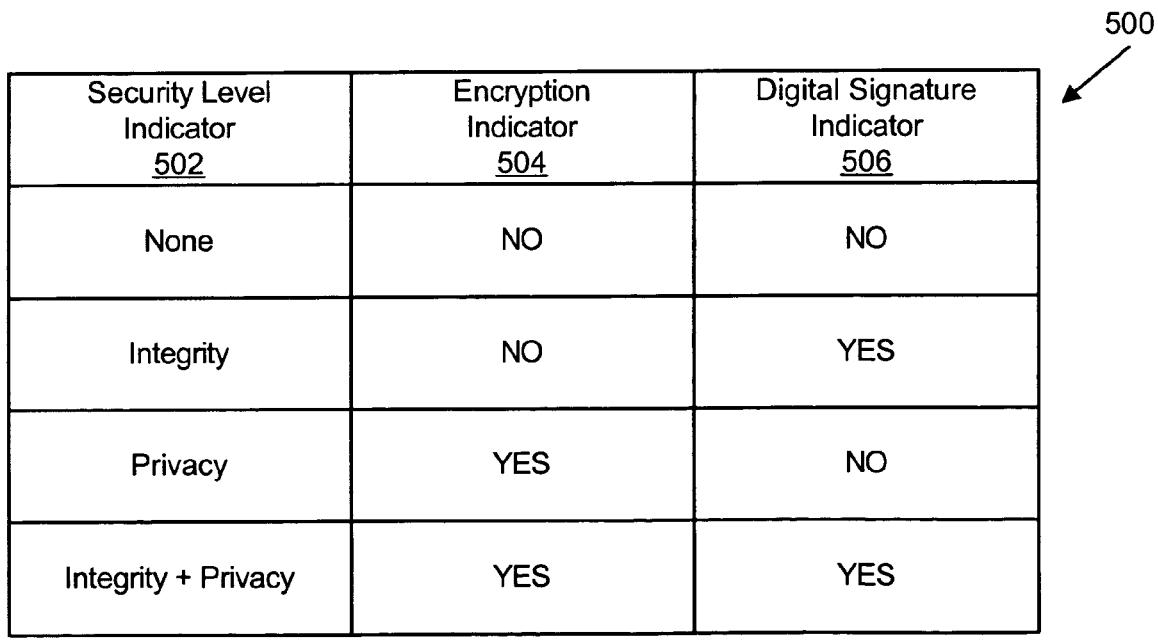
FIG. 5 is a schematic diagram illustrating one embodiment of a security level definition.

FIG. 5 depicts one embodiment of a security level definition 500 that is substantially similar to the security level definition 332 of FIG. 3. In one embodiment, the security level definition 500 defines one or more security levels and, in particular, which security features are to be implemented for each of the security levels. As described above, the security features may include, but are not necessarily limited to, encryption, authentication, and message integrity technologies. In one embodiment, the security level definition 500 may include a security level indicator 502, an encryption indicator 504, and a digital signature indicator 506. For each security level indicated by a security level indicator 502, the corresponding encryption indicator 504 may define whether or not encryption is implemented for the given security level. Similarly, the digital signature indicator 506 may define whether or not a digital signature is implemented for the given security level. Additionally, the encryption indicator 504 and digital signature indicator 506 may define additional parameters, including what type of encryption or digital signature technology, respectively, may be implemented.

In the illustrated example, the security level definition 500 defines four security levels: none, integrity, privacy, and integrity+privacy. In another embodiment, the security level definition 500 may define fewer or more security levels. Additionally, the security level definition 500 may use different security level indicators 502 to identify each security level within the security level definition 500. In the depicted embodiment, the none security level does not implement either encryption or authentication. The integrity security level implements authentication, but does not implement encryption. The privacy security level implements encryption, but does not implement authentication. The integrity+privacy security level implements both encryption and authentication. Although the present example is described in terms of four particular security levels, the number of security levels and various indicators 502, 504, 506 may vary and the security level definition 500 may be modified to adapt to such security levels and to various security technologies.

Figure 6:
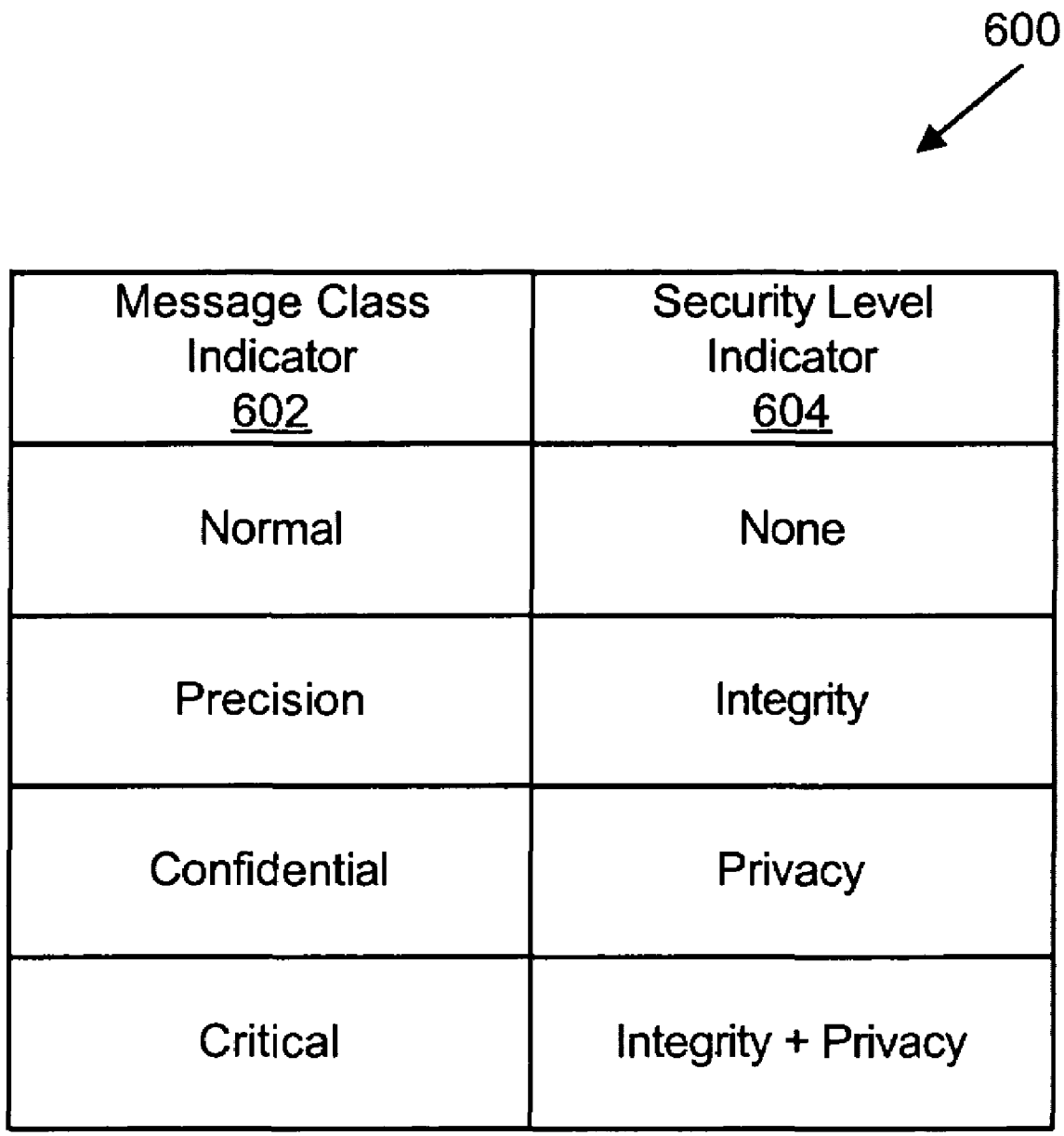
FIG. 6 is a schematic diagram illustrating one embodiment of a security level map.

FIG. 6 depicts one embodiment of a security level map 600 that is substantially similar to the security level map 334 of FIG. 3. In one embodiment, the security level map 600 correlates each of the message classes defined in the message class definition 400 with one of the security levels defined in the security level definition 500. In one embodiment, the security level map 600 may include a message class indicator 602 and a security level indicator 604. The message class indicator 602 may be substantially similar to the message class indicator 402 of the message class definition 400. The security level indicator 604 may be substantially similar to the security level indicator 502 of the security level definition 500.

For each message class indicated by a message class indicator 602, the corresponding security level indicator 604 defines which security level (and, thereby, which security technologies) may be applied to the data structures belonging to the message class. In the illustrated example, the security level map 600 correlates each of four message classes to each of four security levels. In particular, the security level map 600 correlates the none security level to the normal message class, the integrity security level to the precision message class, the privacy security level to the confidential message class, and the integrity+privacy security level to the critical message class. Although the present example is described in terms of a four particular security levels and four message classes, the security levels and message classes may vary and the security level map 600 may be modified to adapt to such security levels and message classes.

In an alternative embodiment, the security level map 600 may define which security technologies may be applied to certain data structures. In this way, the message class definition 400 and the security level definition 500 may be incorporated into the security level map 600, thereby eliminating the need for separate definitions 400, 500 and maps 600. Additionally, the security level map 600 may be user-configurable in certain embodiments.

Figure 7:
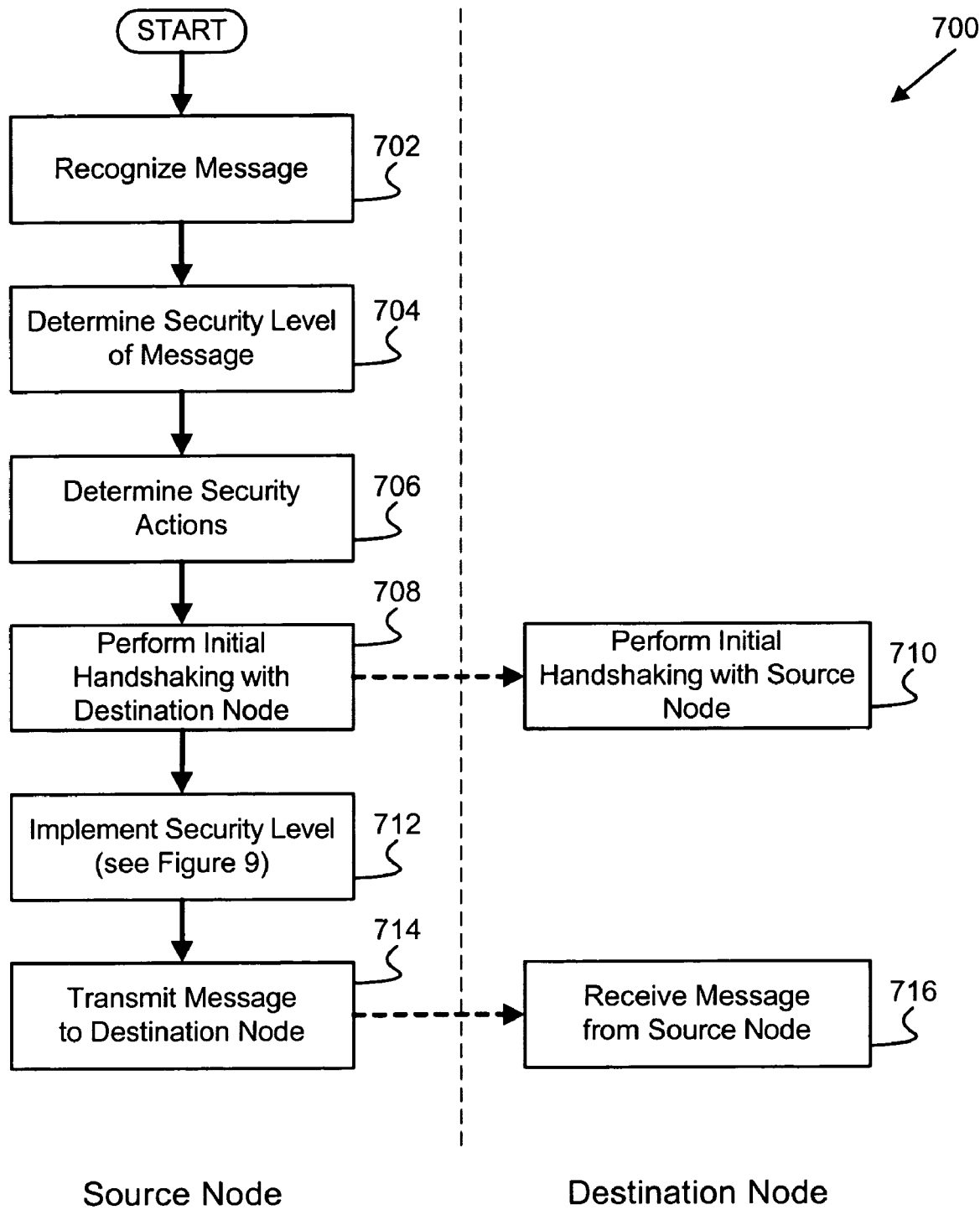
FIGS. 7 and 8 are a schematic flow chart diagram illustrating one embodiment of a security method that may be implemented on the communication system of FIG. 2.
Figure 8:
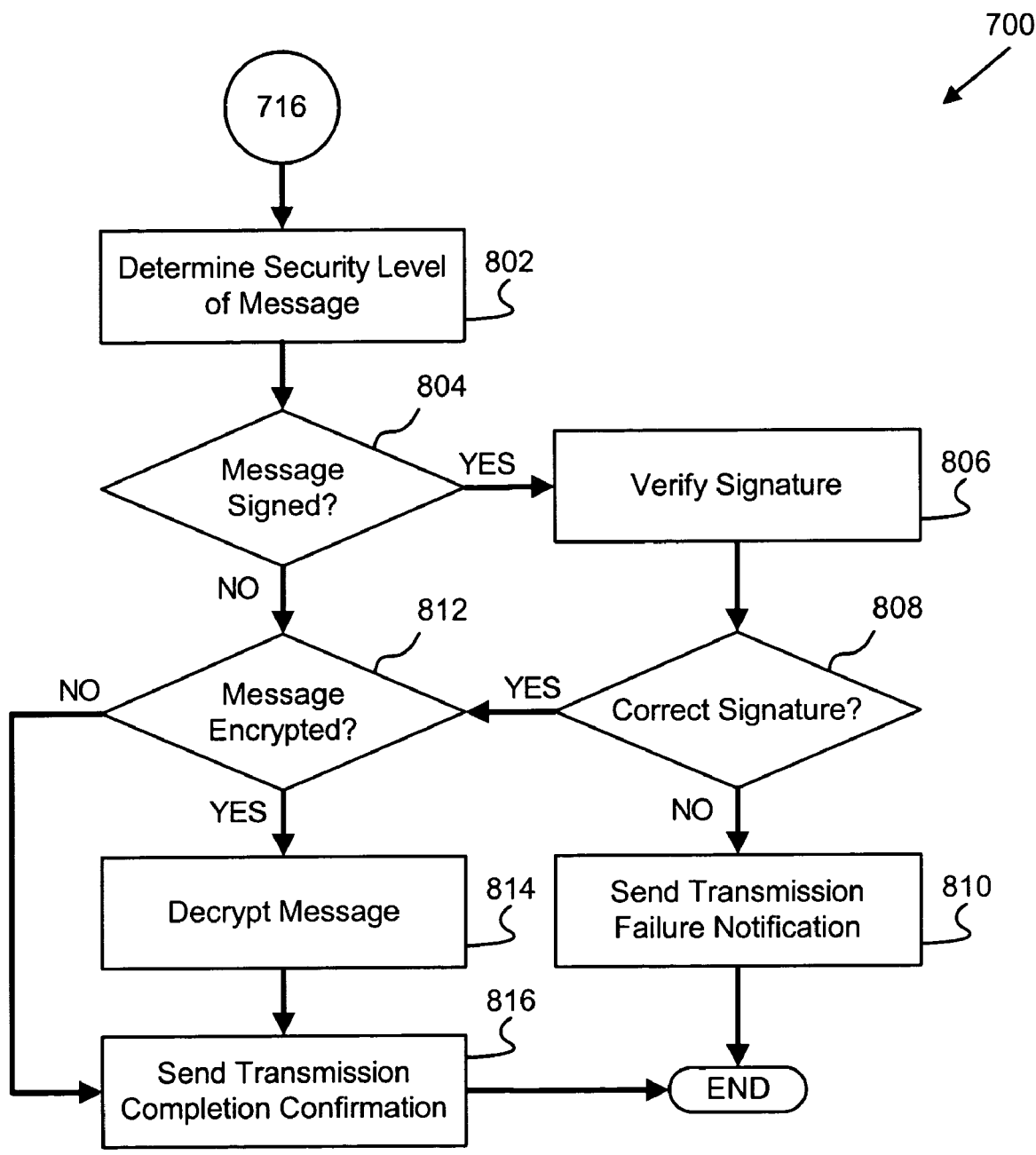

FIGS. 7 and 8 depict one embodiment of a security method 700 that may be implemented on the communication system 200 of FIG. 2. The security method 700 is described to suggest one embodiment in which certain operations may be performed on certain system components, namely, the source node 202 and the destination node 204. However, the separation of operations among various system components, including system components not described, may be facilitated in other manners not shown herein.

The illustrated security method 700 begins when the message apparatus 310 recognizes 702 an internode message 222 at the source node 202. In one embodiment, the messaging module 314 may recognize 702 the internode message 222. The message apparatus 310 then determines 704 the security level of the message 222. In one embodiment, the security module 312 determines 704 the security level of the message 222 by referencing a security level map 600 and potentially a mapping class definition 400 and a security level definition 500. The security module 312 also may determine 706 the security actions to be applied to the message 222 as defined by the security level definition 500.

The message apparatus 310 then may initiate 708, 710 handshaking between the source node 202 and the destination node 204. The handshaking may be used, in one embodiment, at system startup to verify the ready status of the participating nodes and to set up at least part of the message level security. Handshaking does not have to happen for each outgoing message, although handshaking could be employed more frequently than just at system startup, if necessary. In one embodiment, the signature module 326 and/or the verification module 328 may implement a digital signature authentication procedure during the handshaking sequence. Subsequently, the message apparatus 310 may implement 712 additional security features, such as encryption via the encryption module 322, prior to transmitting 714 the message 208 from the source node 202 to the destination node 204, whereupon the destination node 204 receives 716 the message 208. One example of implementing 712 security measures to protect the message 222 is described in more detail with reference to FIG. 9.

The security method 700 continues as illustrated in FIG. 8. Specifically, the destination node 204 determines 802 the security level of the message 208 received from the source node 202. If the destination node 204 determines 804 that the source node 202 implemented a digital signature then the destination node 204 may verify 806 the digital signature and determine 808 if the signature is correct. Otherwise, if the signature is not correct, then the destination node 204 may send 810 a transmission failure notification to the source node 202 to indicate the failure of the transmission.

If the message 208 is not signed or if the digital signature is correct, the destination node 204 then determines 812 if the message 208 is encrypted and, if so, decrypts 814 the message 208. After the message 208 is decrypted 814, or if the message 208 was not encrypted, the destination node 204 may send 816 a transmission completion confirmation to the source node 202 to indicate that the message 208 is successfully received and processed. The depicted security method 700 then ends.

Figure 9:
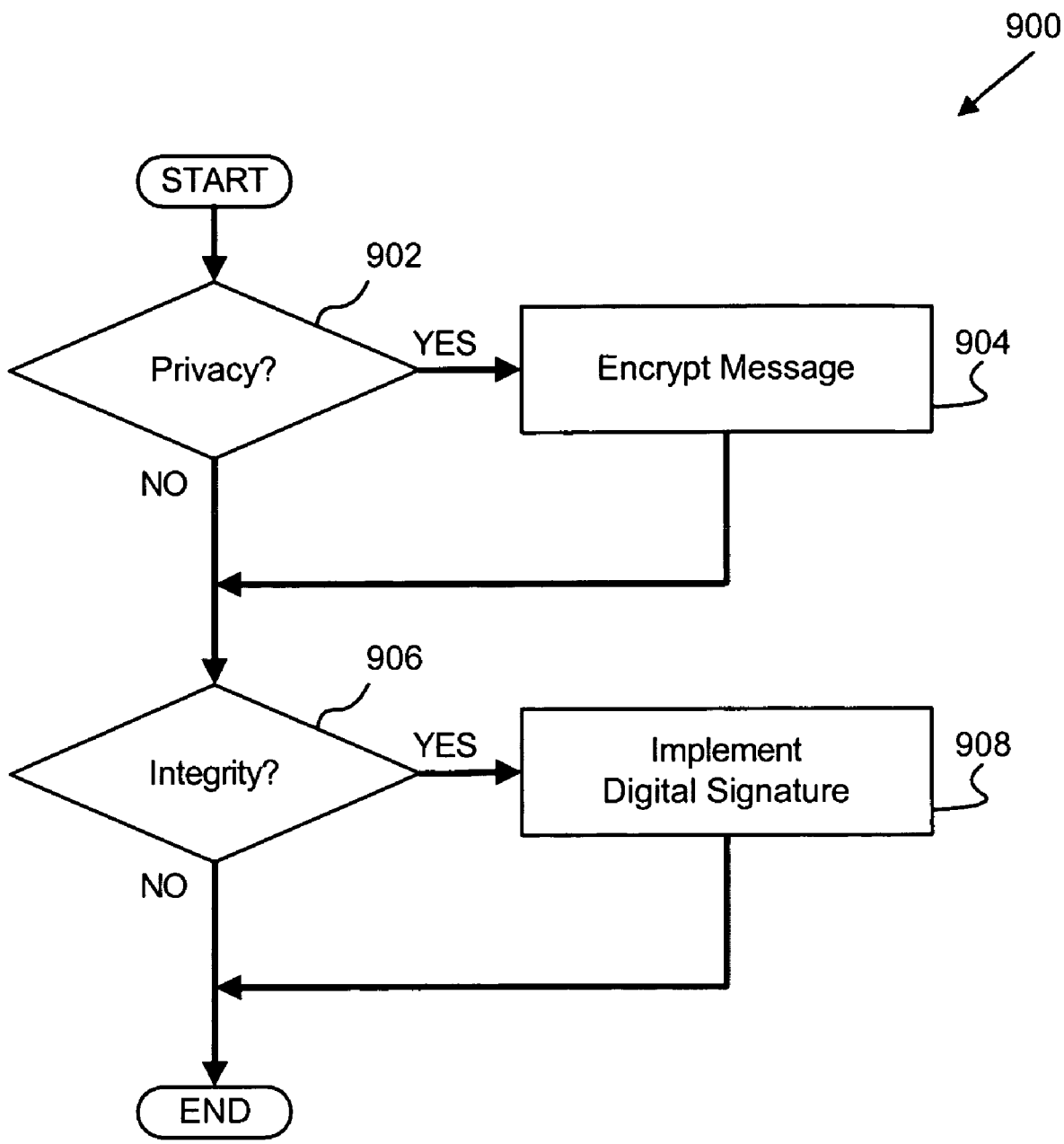
FIG. 9 is a schematic flow chart diagram illustrating one embodiment of a security level implementation method that may be invoked during the security method of FIGS. 7 and 8.

FIG. 9 depicts one embodiment of a security level implementation method 900 that is given by way of example of the implementation operation 712 of the security method 700 of FIG. 7. To begin, in one embodiment, the security module 312 determines 902 if privacy security features should be implemented according to the security level map 600 and/or the security level definition 500. If so, the encryption module 322 encrypts 904 the message 222. The security module 312 also determines 906 if integrity security features should be implemented according to the security level map 600 and/or the security level definition 500. If so, the signature module 326 digitally signs 908 the message 222. The depicted security level implementation method 900 then ends.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to perform operations to facilitate message security, the operations comprising:
    identifying a predetermined message class of an internode message, the predetermined message class identified by a message class indicator, each message class indicator mapped to a particular message security level by a security level map;
    an application layer of a first node mapping the particular message security level to an encryption indicator and a digital signature indicator in accordance with a security level definition;
    applying security to the internode message at the application layer in accordance with the encryption indicator;
    applying a digital signature to the internode message at the application layer in accordance with the digital signature indicator;
    wherein the application layer comprises an application programmed to selectively apply the particular message security level to the entire internode message as defined in the security level map;
    communicating the message between the first node and a second node, wherein the security of the internode message is preserved between the first node and the second node,
    wherein a second application operating on the second node mares the message class indicator to the particular message security level, the second application comprising the same security level map for mapping the message class indicator to the particular message security level and wherein an application layer of the second node applies the particular message security level to the internode message to implement the particular message security level;
    wherein a digital processing apparatus performs the operations by way of one or more of logic hardware comprising at least a processor and hardware memory.

2. The method of claim 1, further comprising communicating the message in a synchronous communication environment.

3. The method of claim 1, further comprising communicating the message in an asynchronous communication environment.

4. The method of claim 1, further comprising encrypting the message.

5. The method of claim 1, further comprising digitally signing the message.

6. The method of claim 1, further comprising maintaining the security level definition descriptive of the particular message security level.

7. The method of claim 1, further comprising maintaining the security level map mapping the particular message security level to the message class.

8. The method of claim 1, further comprising maintaining a message class definition descriptive of a message type within the message class.

9. The method of claim 1, wherein the particular message security level is selected from the group consisting of no security, privacy security, integrity security, and combined privacy and integrity security.

10. An apparatus to facilitate message security, the apparatus comprising:
    a logic unit comprising a processor:
    a hardware memory in communication with the processor, the hardware memory comprising:
    a message class definition module configured to identify a predetermined message class of an internode message, the predetermined message class identified by a message class indicator, each message class indicator mapped to a particular message security level by a security level map;
    a security module configured to map the particular message security level to an encryption indicator and a digital signature indicator in accordance with a security level definition at an application layer of a first node;
    wherein the security module is further configured to apply security to the internode message at the application layer in accordance with the encryption indicator;
    wherein the security module is further configured to apply a digital signature to the internode message at the application layer in accordance with the digital signature indicator;

wherein the application layer comprises an application programmed to selectively apply the particular message security level to the entire internode message as defined in the security level map; and a messaging module configured to communicate the message between the first node and a second node, wherein the security of the internode message is preserved between the first node and the second node, wherein a second application operating on the second node maps the message class indicator to the particular message security level, the second application comprising the same security level map for mapping the message class indicator to the particular message security level and wherein an application layer of the second node applies the particular message security level to the internode message to implement the particular message security level.

11. The apparatus of claim 10, wherein the messaging module is further configured to communicate the message in a synchronous communication environment.

12. The apparatus of claim 10, wherein the messaging module is further configured to communicate the message in an asynchronous communication environment.

13. The apparatus of claim 10, further comprising an encryption module configured to encrypt the message.

14. The apparatus of claim 10, further comprising a signature module configured to digitally sign the message.

15. The apparatus of claim 10, wherein the message class definition module is further configured to maintain the message class definition descriptive of a message type within the message class.

16. The apparatus of claim 10, further comprising a security level definition module configured to maintain the security level definition descriptive of the security level.

17. The apparatus of claim 10, further comprising a security level mapping module configured to map the security level to the message class.

18. A system to facilitate message security, the system comprising:

an electronic storage device configured to store a message class definition descriptive of a predetermined message class;

a message apparatus comprising a logic unit a processor in communication with a hardware memory, the logic unit configured to identify a message class of an internode message, the predetermined message class identified by a message class indicator, each message class indicator mapped to a particular message security level by a security level map, wherein the message apparatus is configured to map the particular message security level to an encryption indicator and a digital signature indicator in accordance with a security level definition at an application layer of a first node;

wherein the message apparatus is further configured to apply security to the internode message at the application layer in accordance with the encryption indicator;

wherein the message apparatus is further configured to apply a digital signature to the internode message at the application layer in accordance with the digital signature indicator, the application layer comprising an application programmed to selectively apply the particular message security level to the entire internode message as defined in the security level map;

wherein a second application operating on the second node maps the message class indicator to the particular message security level, the second application comprising the same security level map for mapping the message class indicator to the particular message security level and wherein an application layer of the second node applies the particular message security level to the internode message to implement the particular message security level; and a network interface configured to transmit the internode message from the first node to a second node, wherein the security of the internode message is preserved between the first node and the second node.

19. The system of claim 18, further comprising a security level mapping module configured to map the security level to the message class.

20. The system of claim 18, wherein the message apparatus is further configured to communicate the message in an asynchronous communication environment.

21. The method of claim 1, further comprising:

delivering the internode message to a second application operating on the second node, the second application comprising the same security level map mapping the message class indicator to the particular message security level; and applying the particular message security level to the internode message at an application layer of the second node to implement the particular message security level.

* * * * *

UNITED STATES PATENT AND TRADEMARK OFFICE
CERTIFICATE OF CORRECTION

PATENT NO. : 7,644,266 B2  Page 1 of 1
APPLICATION NO. : 10/948609
DATED : January 5, 2010
INVENTOR(S) : Ahuja et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1193 days.

Signed and Sealed this

Sixteenth Day of November, 2010

David J. Kappos
*Director of the United States Patent and Trademark Office*